Aug. 24, 1948.                H. W. PROTZELLER                    2,447,665
                  REFRIGERATED PRODUCTS AND METHODS AND
                         APPARATUS FOR PRODUCING SAME
Filed April 3, 1942                                         6 Sheets-Sheet 1
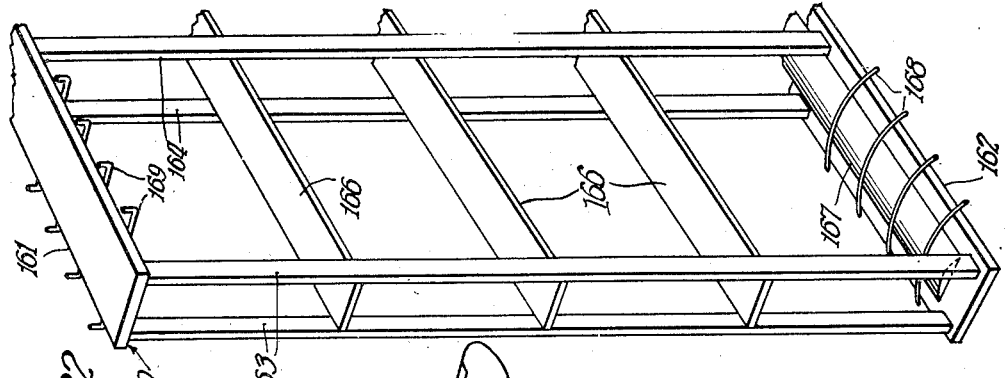
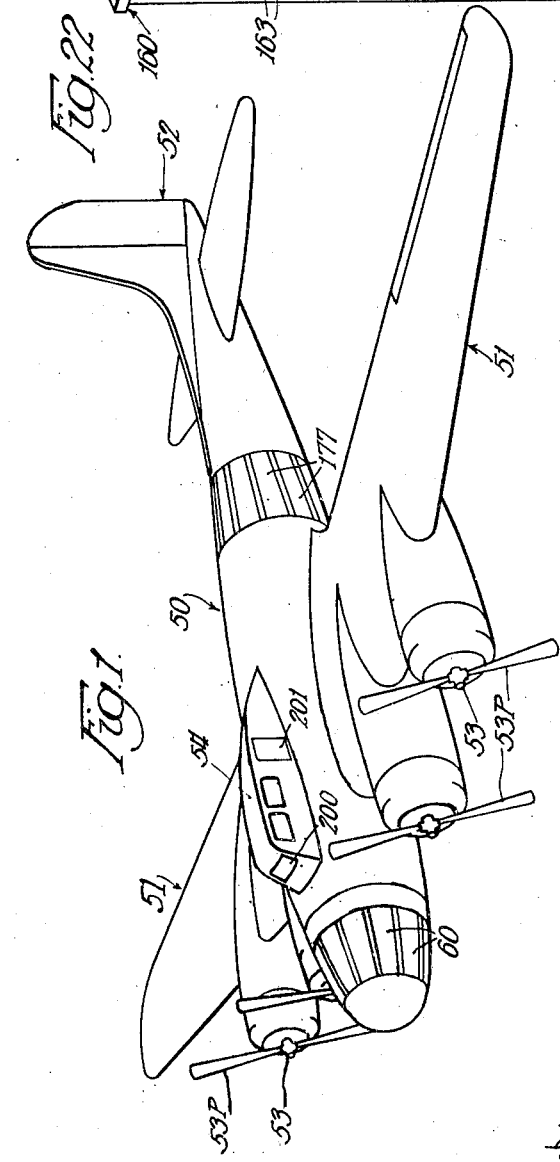
Inventor
Harry W. Protzeller
By

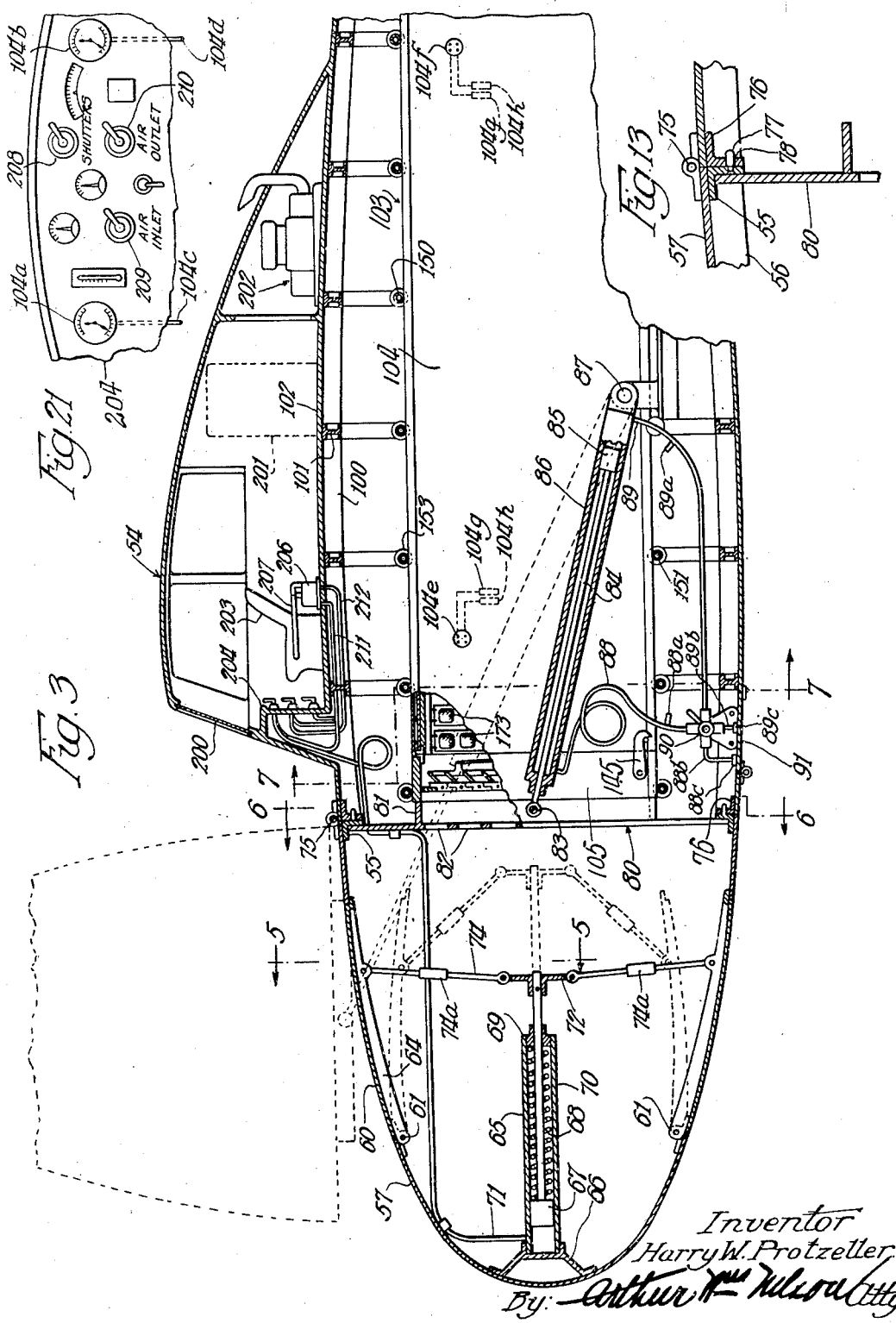

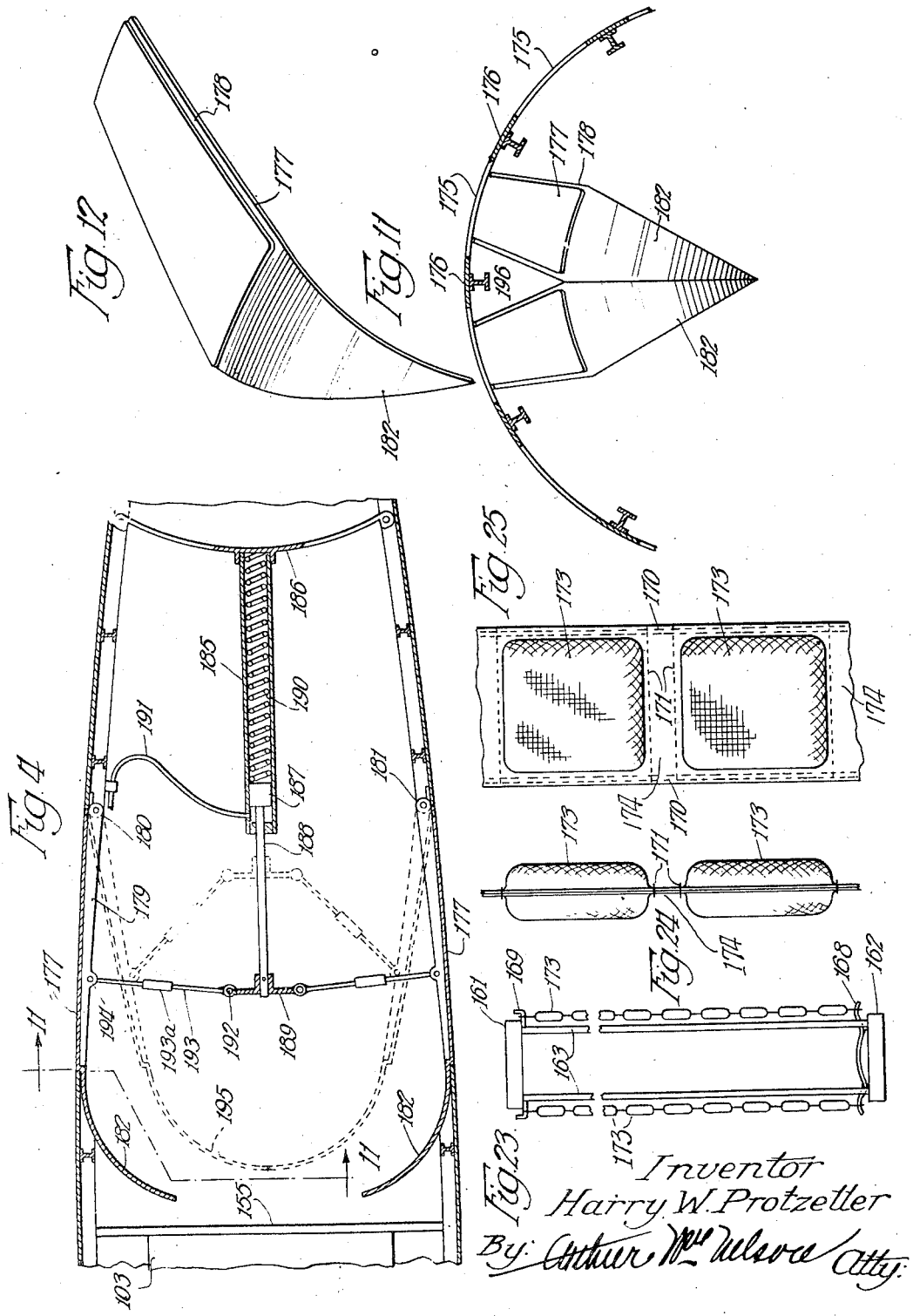

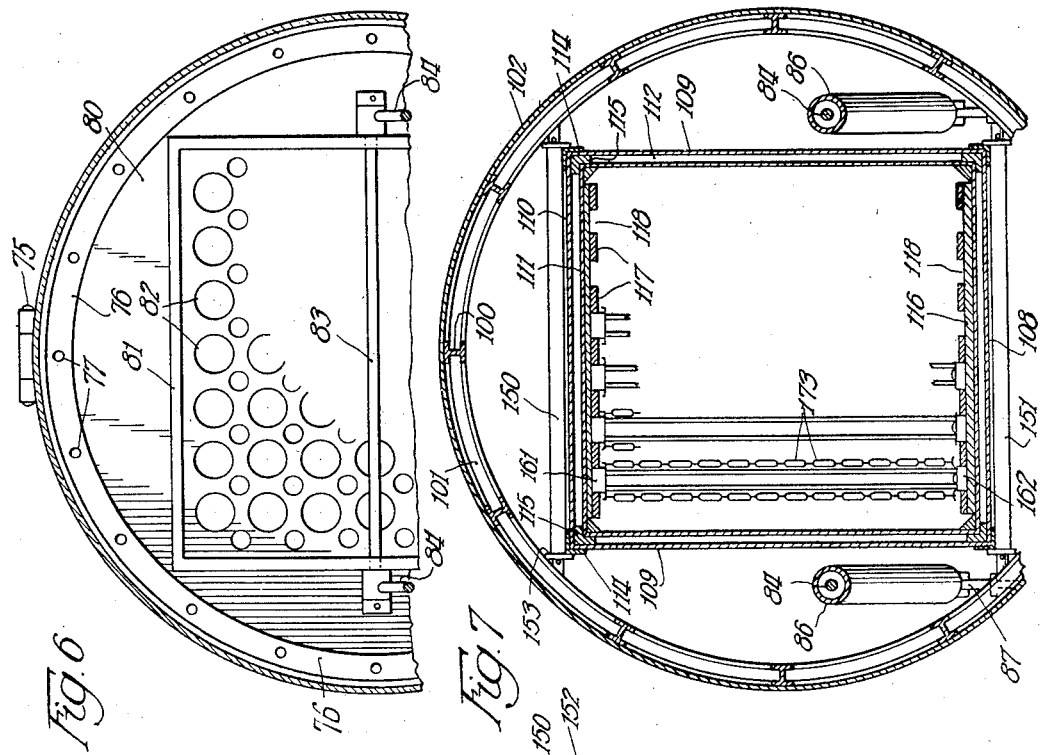
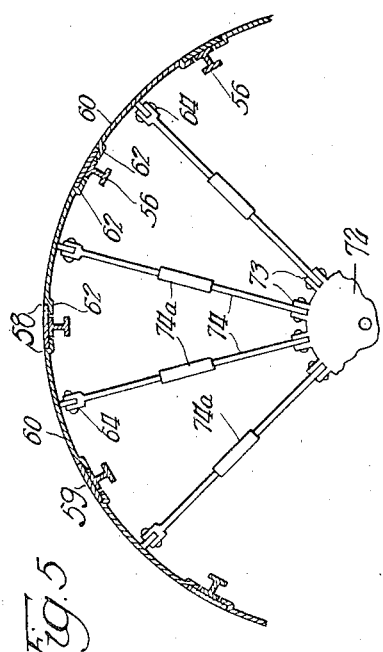
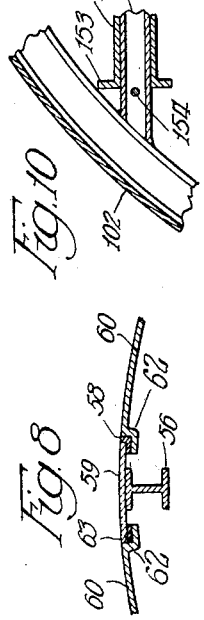
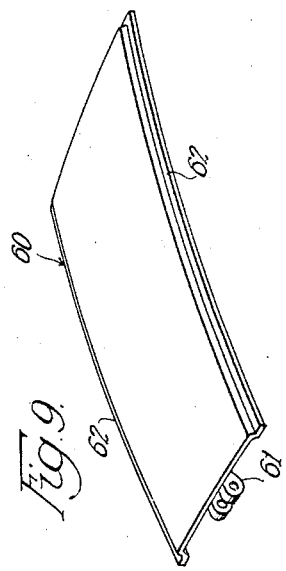
Inventor
Harry W. Protzeller

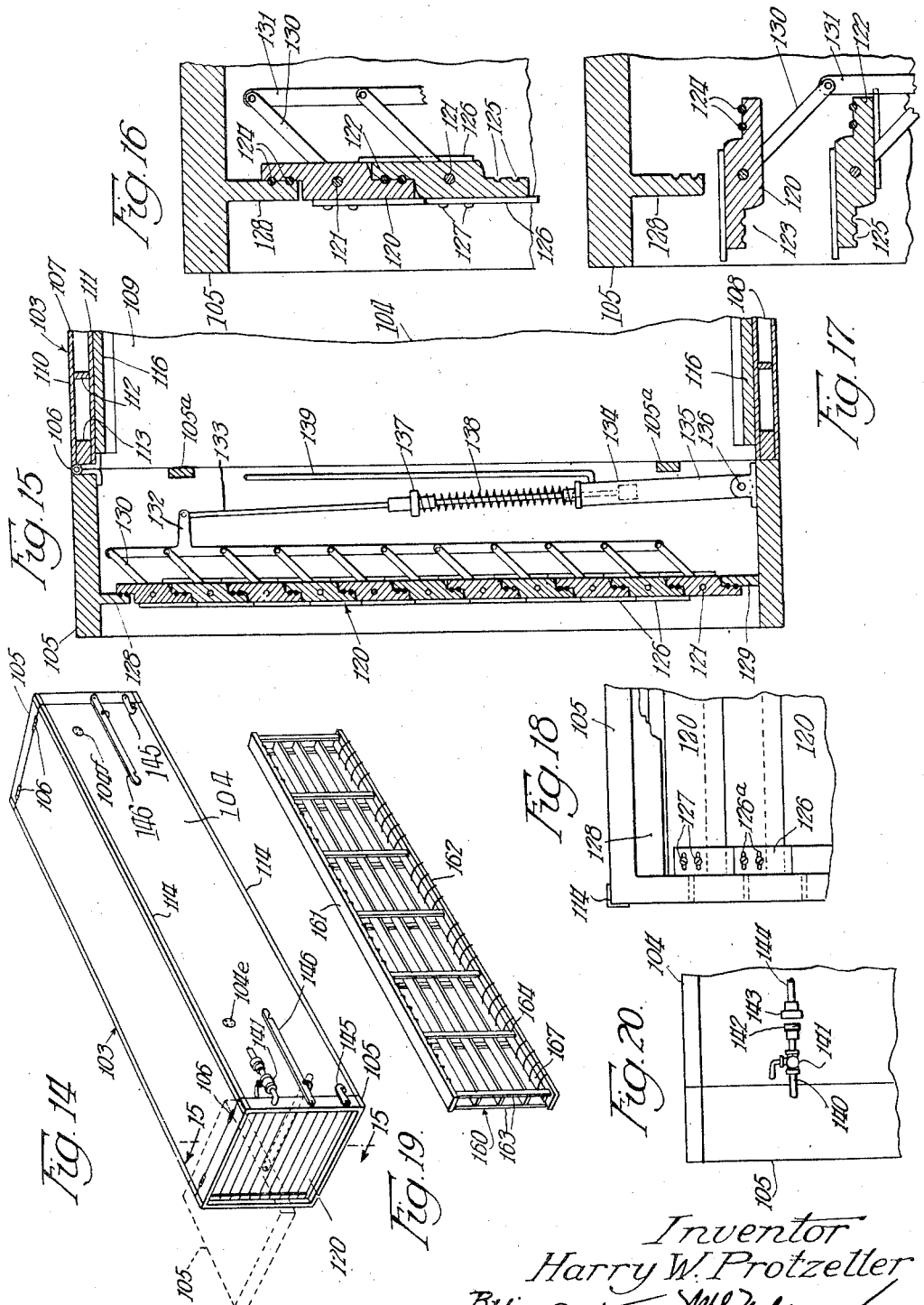

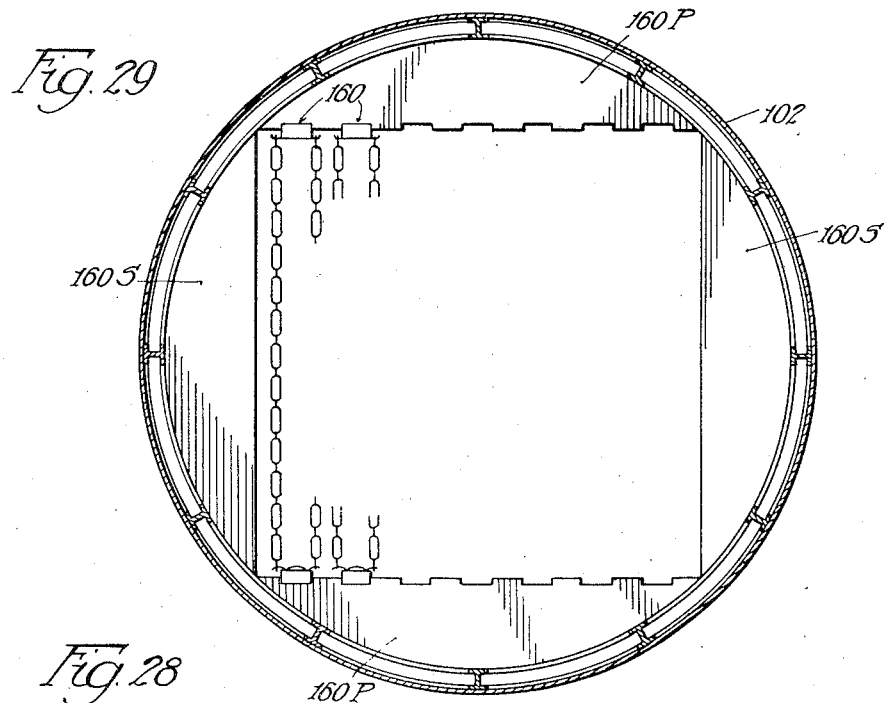
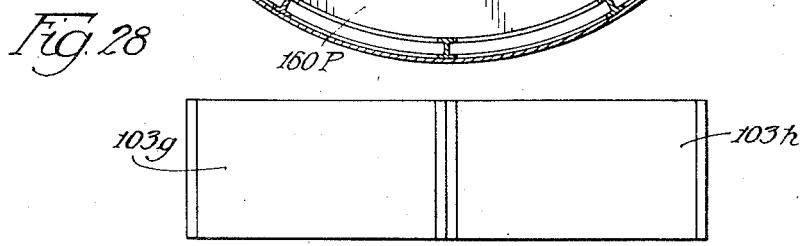
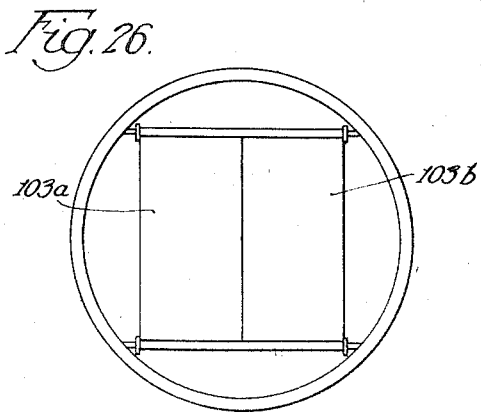
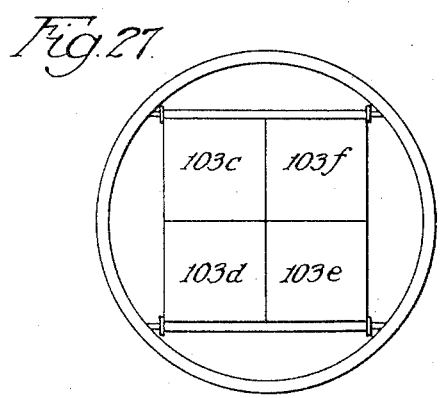

Patented Aug. 24, 1948

2,447,665

UNITED STATES PATENT OFFICE 2,447,665

REFRIGERATED PRODUCTS AND METHODS AND APPARATUS FOR PRODUCING SAME

Harry W. Protzeller, Fairmont, Minn., assignor to Tampa Aviation, Inc., Tampa, Fla., a corporation of Florida Application April 3, 1942, Serial No. 437,540

20 Claims. (Cl. 62—1)

My invention relates generally to the freezing of products of various kinds and to methods and apparatus for producing same, but in some of its aspects is concerned more particularly with the so-called quick freezing of the product.

There are a number of commercial methods of refrigeration heretofore available and which are practiced by the use of compression machines using volatile liquids, absorption machines using volatile liquids, dense air systems in which air is never allowed to fall to atmospheric pressure, etc. The use of all of these commercial methods or systems presupposes that the surrounding atmosphere is at a temperature much higher than that desired as the final temperature of the product to be refrigerated. Hence, in such commercial refrigerating methods a low temperature is produced in a medium by the expenditure of energy, which low temperature medium is then taken to the product to be refrigerated.

As stated above, in some of its aspects the invention is particularly concerned with the so-called quick freezing of products. While the term "quick freezing" cannot be exactly defined in a few words, it is a term which is now in rather general use. In a broad sense, the term applies to the freezing of products in a relatively short time as compared with the freezing of the products in a relatively long period of time as employed in the ordinary freezing methods as commercially practiced. By the so-called quick freezing methods or processes, certain of the natural desirable characteristics of certain products are thought to be retained, which are considered lost, in whole or in part, when such products are frozen by the slow freezing methods or processes.

Quick freezing is employed extensively in connection with the processing of meats, fowl, fish, vegetables of various kinds, fresh berries, fresh fruits and other products and I shall refer herein to the same, whatever they may be, as "products."

There are two general methods of quick freezing products heretofore in general use, one being the conduction method, and the other the convection method. In some processes a combination of conduction and convection is employed in the same apparatus. No matter what the method used may be, it has been necessary to provide refrigerating apparatus which will create and maintain a very large temperature differential between the product being frozen and the refrigerating medium. Such a plant requires powerful motors, or other prime movers, compressors, condensers, extensive piping, mechanical devices for handling the product and many other items. A quick freezing plant, therefore, is very expensive to build and costly to operate.

Because a quick freezing plant is expensive to build and costly to operate, they are relatively few in number and are widely scattered. The product to be frozen in order to secure best results should be subjected to the quick freezing treatment shortly after it is removed from its natural environment, if it be fruits, vegetables, berries and the like, or shortly after the product is available, if it be fish, oysters, fowl and the like. For the foregoing reasons, the territory served by a quick freezing plant is usually quite localized. Hence producers throughout the greatest part of the country do not have access to quick freezing plants in which their products may be processed.

After the product has been frozen in the plants heretofore in use, there is still involved the matter of distribution, which also presents quite a problem. After freezing, it is essential that the product be kept at low temperature, preferably at a maximum of 20° F. during transportation. If the means for maintaining low temperatures during transportation fails and the product temperature rises above 32° F., it is likely to result in the complete spoilage thereof.

From the above, it is obvious that the total cost of freezing, storing and transporting quick frozen products is high, exclusive of such costs of packaging and distribution, as would be normal to a non-frozen product.

One object of the invention is to provide a method and apparatus wherewith products can be refrigerated on a commercial basis without the necessity of expending energy to produce a low temperature medium or refrigerant for submission to the product.

Another object of the invention is to provide a method and apparatus wherewith the freezing of products may be accomplished on a commercial basis by expending energy to move the product to a region of low temperature and there utilizing the low temperature of such region to effect refrigeration.

Again, it is an object of the invention to provide methods and apparatus wherewith the product may be refrigerated while being transported at a high elevation and by means of the low temperature medium there available.

It is also an object of the invention to provide simplified methods and apparatus whereby the costs of quick freezing products may be reduced.

Another object of the invention is to provide quick freezing methods and apparatus which will simplify the transportation of the product.

Again it is an object of the invention to provide methods and apparatus whereby the period intervening from the time the quick freezing operation is started to and including the transportation of the product to the desired delivery point may be greatly reduced.

A further object of the invention is to provide methods and apparatus of such character that the same can be made available at any of a large number of points throughout the country and which apparatus can be readily shifted from place to place, as conditions require.

Still another object of the invention is to provide methods and apparatus whereby it shall be possible to subject the product to such treatment as to produce certain advantageous changes in the product which are not obtainable from the ordinary quick freezing processes or apparatus heretofore available.

Various other features of improvement and advantage of the invention will become apparent to those skilled in the art from a consideration of the present preferred embodiment of the invention illustrated in the accompanying drawings forming a part of the specification.

In the drawings:

Fig. 1 is a perspective view of an airplane embodying one form of the invention and capable of use in carrying out my novel method of freezing products.

Fig. 2 is a view partly in side elevation and partly in longitudinal section, in schematic form, of the airplane appearing in and on substantially the scale of Fig. 1.

Fig. 3 is a longitudinal vertical sectional view through the fore part of the fuselage of the airplane appearing in Fig. 1 and on an enlarged scale with respect to Fig. 1.

Fig. 4 is a longitudinal vertical sectional view through an aft part of the airplane on the scale of and being substantially a continuation of that part shown in Fig. 3.

Fig. 5 is a transverse vertical sectional view through a part of the structure shown in Fig. 3 but on a scale enlarged thereover, the plane of the section being indicated by the line 5—5 on Fig. 3.

Fig. 6 is a transverse vertical sectional view through a part of the structure shown in Fig. 3 as taken on the line 6—6 thereof but on the scale of Fig. 5.

Fig. 7 is another transverse vertical sectional view through a part of the structure appearing in Fig. 3 as taken on the line 7—7 thereof, also on the scale of Fig. 5.

Fig. 8 is a view of parts shown in the upper central portion of Fig. 5, but on an enlarged scale and more particularly illustrates the means whereby it is possible to seal closed the lateral margins of a number of air intake valve plates embodied in the airplane of Fig. 1.

Fig. 9 is a perspective view of an air intake valve plate embodied in the airplane of Fig. 1 and which will be more fully referred to later.

Fig. 10 is a detail vertical sectional view of parts appearing in Fig. 7 on an enlarged scale relative thereto and which will be more fully referred to later.

Fig. 11 is a transverse vertical sectional view of parts appearing in and as taken on the line 11—11 of Fig. 4 on an enlarged scale relative thereto.

Fig. 12 is a perspective view of a certain air outlet valve plate forming a part of the invention and which will be more fully referred to later.

Fig. 13 is a detail view on an enlarged scale relative to Fig. 3 of parts appearing at the upper end of the section line 6—6 of Fig. 3 and more particularly illustrates the construction associated with the hinged connection of the nose to the body of the fuselage and whereby the weight of the nose is removed from the hinge.

Fig. 14 is a perspective view on a relatively small scale of a certain product container adapted to be carried by the airplane of Fig. 1.

Fig. 15 is a vertical sectional view on an enlarged scale relative to Fig. 14 through one end of the container appearing in and as taken on the line 15—15 of Fig. 14.

Fig. 16 is a detail view of parts appearing in the upper portion of Fig. 15 on an enlarged scale relative thereto, and with the louvers or dampers thereof in a position closing the end of the container.

Fig. 17 is a view similar to Fig. 16 and illustrates the louvers or dampers thereof in the open position.

Fig. 18 is a fragmentary view in elevation of one end corner of the container appearing in Fig. 14 and illustrates more particularly how the ends of the louvers or dampers are sealed air tight when said louvers or dampers are in a closed position.

Fig. 19 is a perspective view on substantially the scale of Fig. 14 of one of a number of product supporting racks adapted to be disposed within and withdrawn from the container appearing in said Fig. 14.

Fig. 20 is a fragmentary view in side elevation of an upper and corner part of the container of Fig. 14 on an enlarged scale relative thereto and more particularly illustrates structure whereby a high pressure flexible hydraulic tubing may be coupled to and uncoupled from a similar tubing for hydraulic pressure actuated parts in the associated end of the container for opening the louvers or dampers therein.

Fig. 21 is a fragmentary view in elevation of a part of an instrument board located in the cabin of the airplane for the purposes to appeal later.

Fig. 22 is a perspective view of one end of the product supporting rack appearing in Fig. 19 on an enlarged scale relative thereto.

Fig. 23 is a view in end elevation of the rack shown in Figs. 19 and 22, with a central portion broken away, and illustrates the manner in which certain individual product holders are supported by the rack.

Fig. 24 is an edge view in elevation of a fragment of a product molding multiple package strip forming a part of the invention and which will be more fully mentioned later.

Fig. 25 is a face view in elevation of the fragment of the product holding multiple package strip appearing in Fig. 24 and which will also be mentioned later.

Fig. 26 is a diagrammatic transverse vertical sectional view similar to Fig. 7 but illustrating a modified construction.

Fig. 27 is a view similar to Fig. 26 but illustrating still another modified construction.

Fig. 28 is a diagrammatic side elevational view of a modified box-like structure of the general type illustrated in Fig. 14 and Fig. 29 is a transverse vertical sectional view on the scale of Fig. 7 but showing a modified construction.

Referring first particularly to Figs. 1 and 2, the apparatus there illustrated constitutes an airplane or carrier, some of which is or may be of ordinary or known construction and other parts of which are of novel design in order to function for the intended purpose. Thus 50 as a whole represents the fuselage, 51 the wing structure and 52 the tail structure. The wing structure 51 and the tail structure are of usual form and are controlled by the pilot by conventional means which it is not thought necessary to describe.

The wing carries a plurality of engines 53 which are preferably of the supercharged type as it is contemplated that the airplane will fly at very high altitudes at least part of the time. Each engine drives a propeller 53P. The airplane as a whole is preferably of substantial size in order to be able to carry a large load and the engines should have sufficient power to be able to move the plane and its contained load to a sufficiently high altitude as to find an atmosphere where very low temperatures prevail. However, since it is not necessary that the airplane fly at high speeds, the power to weight ratio need not be relatively high.

Referring particularly to Fig. 2, the part between the dot and dash lines 1 and 2 will, for convenience, be referred to as the nose section; the part between the dot and dash lines 2 and 3 the cargo carrying section, and the part between the dot and dash lines 3 and 4 as the aft section.

Preferably on the cargo carrying section there is provided a cabin 54 which is of such construction that it may be made pressure-tight. As will appear later, it is provided with means whereby such pressure conditions may be maintained therein as will permit the pilot to operate comfortably and safely even at very high altitudes.

The cabin also contains the necessary controls for operating the airplane but since these are or may be conventional, no description is thought necessary.

It is thought that a brief general description of the construction and operation of the apparatus and method will facilitate an understanding of the invention.

Brief general description

In the nose section there is arranged a valve structure composed of a number of segments and means are provided whereby the pilot may, when he so desires, cause them to open or close. When open, with the airplane in flight, they permit the passage of air into the interior of the nose section. When closed, they provide a smooth outside skin for the nose section and eliminate any air drag.

Between the nose section and the cargo carrying section is means wherewith to control the amount and the velocity of air which may pass through the cargo carrying section.

In the cargo carrying section is a cargo container, here shown as in the form of an elongated box of rectangular cross section and which is secured in such manner that it may be readily removed from the cargo carrying section, when desired. The cargo container is provided with valve means for controlling the passage of air through the container. Means within the container are such that the cargo or product to be refrigerated is suitably and securely supported in separated masses so that large volumes of air may pass through the container and in its passage, freely come into contact with the product.

The air after passing through the container, passes out to atmosphere through controlled valve means positioned in the aft section of the airplane.

The details of construction and operation of the various parts will now be described.

The nose section

The nose section, best shown in Figs. 1, 2 and 3 is shaped somewhat like the end portion of an egg so as to present a relatively blunt, but smoothly curved surface, well adapted for passage through the air. In the open rear end of the nose section is fixed an angle bar ring 55 (see Fig. 13) which strengthens and braces said end. The nose section includes a suitable skeleton frame embodying therein a plurality of arcuately spaced, longitudinal I-beam-like ribs 56 which at their rear ends are fixed to the ring 55. The ribs mentioned are covered with a "skin" 57 of suitable sheet metal, and which skin is fixed to the rib work of the frame in the usual manner.

In the skin of the nose section there is a plurality of air inlet openings 58, each flaring in width from the front end of the nose section toward the open rear end thereof. The sides of each opening are formed by sheet metal strips 59, the lateral margins of which project laterally beyond the edges of the I-beam ribs to which said strips are attached as best shown in Fig. 8.

Associated with each air inlet opening 58 is a closure plate 60 best shown in perspective in Fig. 9. Each closure plate is hingedly connected as at 61 (see Fig. 3) to the framing of the nose section so that it may be swung from a position losing its opening as shown in full lines in Fig. 3, to a position uncovering or exposing said opening, as shown in Figs. 2 and 3. Of course each valve closure plate is of such shape and size as to conform to its associated opening 58 and its side margins and rear end margin are formed with a hook-like flange 62. This flange has a sealing strip or gasket 63 of relatively soft rubber fixed to its outer surface. When the valve plates are in the closed position, the margins 62 thereof underlap not only the margins of the strips 59 that define the sides of each opening 58 but also that part of the skin 57 which defines the rear end of each opening so that the strips 63 seal the openings 58 when the valve plates 60 are closed. Each valve plate has a longitudinal rib 64 operatively secured to its inner surface which not only stiffens the valve plate but forms a convenient part to which the associated actuator may be connected as will later appear.

The valve plates 60 are simultaneously moved from an open to a closed position and vice versa by means now to be described. In the front end and disposed in the longitudinal axis of the nose section is a hydraulic cylinder 65 fixed at its front end in a spider 66 operatively secured to the axial part of the nose section as best appears in Fig. 3. A piston 67 is disposed in said cylinder and is connected to the front end of a piston rod 68. This rod slides through a closure 69 in the rear end of the cylinder. A relatively strong expansion spring 70 is disposed in the cylinder and surrounds that part of the piston rod between the closure 69 and piston 67 and tends to move the piston and piston rod forwardly. Hydraulic fluid is admitted at the front end of the cylinder, ahead of the piston by means of a flexible tube 71 leading from a source of hydraulic fluid supply as will appear later. When such fluid is admitted to the front end of the cylinder, it causes the piston to move rearwardly therein and compress the spring 70. When such fluid is cut off from the cylinder, the spring moves the piston and piston rod forwardly.

A spider plate 72 is fixed to the rear end of the piston rod and this plate is provided in its periphery with pairs of ears 73—73, best shown in Fig. 5, there being one pair of such ears for each closure plate 60. An actuator rod 74 is pivoted at one end between each pair of ears 73 and has its other end pivoted to the rib 64 of the associated closure plate 60. In each rod 74 is a turnbuckle 74a best shown in Fig. 5, whereby the effective length of the rod may be accurately produced.

When hydraulic fluid is admitted to the cylinder 65 so that the piston rod 68 is projected rearwardly, as appears in dotted lines in Fig. 3, the rods 74 will cause the valve plates to swing inwardly of the nose section, about their hinged connections 61. When such fluid is cut off from said cylinder the spring 70 projects the piston rod forwardly and this, through the actuator rods 74, will cause the valve plates to swing outwardly of the nose section to a closed position. When the valve plates are in the closed position, the spider plate 72 is in a position just a trifle in advance of a plane passing through the pivotal connection of the rods 74 with the valve plates and this produces an overcenter lock for said valve plates so that they cannot accidentally open. This overcenter locking feature is permitted by the rubber sealing strips 63 which "give" to that amount, making this feature possible. Thus, the strips 63 perform two functions, one of which is to seal the valve plates 60 in the closed position and the other of which is to permit the overcenter locking of the plates in the closed position.

*Mounting of the nose section*

The nose section is hingedly connected at its top rear end part to the top front end part of the cargo carrying section as by a hinge 75. Within the front end of the cargo carrying section of the fuselage is an angle bar ring 76 that has a snug face-like fit with the angle bar ring 55 at the rear end of the nose section. The ring 55 carries a plurality of relatively short rearwardly extending pilot pins 77 (see Fig. 13) which, when the nose section is in its closed position, fit in openings 78 in one of the flanges of the ring 76. Said pilot pins not only assure of a proper engagement between the nose and the cargo carrying sections when the nose is being moved into a closed position, but they also take the weight of the nose section off of the hinged connection 75 when said nose section is in said closed position.

The ring 55 has fixed thereto the marginal part of a velocity reducer plate 80. On the rear face of this plate is an open, rearwardly extending rectangular frame 81 of an area corresponding to that of the front end of a cargo container adapted to be carried in the cargo carrying section. Within the area of the frame 81 as best shown in Fig. 6 is a plurality of holes 82 through which air may pass at a reduced velocity from the nose section into the cargo carrying section. A shaft 83 passes through the mid portion of opposite sides of the frame 81 and has its ends projecting beyond said sides as best appears in Fig. 6.

Each end part of the shaft has operatively connected thereto one end of a piston rod 84, the other end of each rod having a piston 85 thereon which is disposed in a hydraulic cylinder 86. The rear end of each cylinder is pivotally mounted on a transverse horizontal pivot 87 so that the cylinder may swing in a vertical plane about said pivot. Each cylinder is disposed laterally outward from the associated sides of the frame 81. It is, therefore, located laterally outward from the sides of the cargo container (see Fig. 7) previously mentioned and which has a cross sectional area approximating that of the frame 81.

One cylinder has flexible conduits 88 and 89 respectively connected to each of its ends, while the other cylinder has flexible conduits 88a—89a connected to each of its ends, the conduits 88a and 89a also being connected to the conduits 88—89 as best appears in Fig. 3.

The conduits 88—89 which are high pressure ones are also connected to two bosses of a four-way valve 90, while the other two bosses thereof have short lengths of tubing 88b and 89b respectively connected thereto and each of which carries a coupling part 88c and 89c respectively. The valve 90 is disposed at the bottom of the front end of the cargo carrying section and conveniently above a hinged door 91 in said bottom so as to be accessible by a member of a ground crew when necessary.

The member of the ground crew is provided with a portable unit having a source of hydraulic fluid under pressure and a receiver for such fluid (not shown) each of which is provided with a coupling part for attachment to the coupling parts 88c and 89c respectively. When said portable unit is connected to the conduits 88b and 89b respectively and the valve 90 has been properly manipulated, hydraulic fluid under pressure is admitted to the rear end of each cylinder 86 to drive the piston 85 therein forwardly. This causes a projection of the piston rods 84—84 so that the nose section is swung upwardly about the hinge 75 into the dotted line position shown in Fig. 3, to give complete access to the now open front end of the cargo carrying section. It is pointed out at this time that as the pistons 85—85 move forwardly, the hydraulic fluid in advance thereof passes out through the conduits 88—88a and the valve 90 into the fluid receiver.

To close the nose section, the valve 90 is manipulated to admit hydraulic fluid under pressure to the front ends of the cylinders 86—86 and this drives the pistons 85—85 rearwardly and draws the piston rods 84—84 into the associated cylinders. This causes the nose section to swing easily and slowly about its hinge 75 into a closed position as before. By manipulation of the valve 90, fluid is cut off from the said ends of the cylinders so that the fluid in advance of the pistons acts as a lock to hold the nose section closed. The portable unit is disconnected from the couplings 88c and 89c and the door 91 is then closed. It is apparent that with this arrangement, as the valve for manipulating the nose section is not disposed in the cabin, the pilot has no control thereover from the cabin. Thus under no condition, while the plane is in flight, can the nose section be opened. This places the control of opening and closing the nose section on a member of a ground crew so that said section can be opened and closed only while the airplane is grounded.

*Cargo carrying section and cargo container*

The cargo carrying section is hollow or tubular and includes arcuately spaced longitudinal ribs 100 and longitudinally spaced rings 101, to which the sheet metal skin 102 of the fuselage is secured in the conventional manner. In the interior of the cargo carrying section is provided a relatively long cargo container 103 of a rectangular cross sectional shape corresponding to that of the frame 81 on the rear face of the velocity reducer plate 80.

This cargo container, which appears in perspective in Fig. 14 comprises an open ended hollow body 104 and a door or the like 105 at each end of said body. Said doors are hingedly connected to the respective ends of the top wall of the body by hinges 106—106, one of which best appears in Fig. 15.

The body 104 is of a hollow double wall lightweight construction. It includes a top, a bottom and sides 107, 108 and 109 respectively (see Fig. 15) each constituted by inner and outer spaced plywood sheets 110 and 111 respectively so as to leave air space between said sheets. In said air space are spacing ribs 112 for strength and at each end of said space is a closure and filler 113 of wood. On the outer surface of each longitudinal corner of the body is a metallic reinforcing angle 114 and in each longitudinal corner of the body is a reinforcing bar 115 (see Fig. 7) also of wood. The structure mentioned is strong and rigid though light in weight. On the inner surface of the top and bottom of the body 104 is a wooden sheathing 116 to which are secured longitudinally extending laterally spaced strips 117. The spaces between said strips provide laterally spaced, downwardly and upwardly opening grooves 118 respectively which are intended to receive certain product supporting racks, later to be described.

Each door is provided with a vertical series of louvers or shutters 120 (see Fig. 15), each fixed to a center rockshaft 121 journalled at their ends in the side members of the door. Each louver is provided with flange portions 122 along opposite margins which, when the louvers are in the closed position, engage in recesses 123 of the next adjacent louvers as best appears in Figs. 16 and 17. Sealing elements 124 are carried by one face of one flange portion 122 of each louver to engage in grooves 125 in the flange portion of the adjacent louver. Thus when the louvers are closed, the sealing elements preclude the leakage of air between the louvers. On the faces of each louver, at each end thereof is a sealing strip 126 for effectively sealing off the space between the ends of the louvers and the inner faces of the side walls of the door with which they approximately engage. These sealing strips have transverse slots 126a therein (see Fig. 18) through which attaching screws 127 pass for securing the sealing strips in place. Thus by the screw and slot arrangement mentioned, it is possible to insure a good tight edge sealing engagement for the strips with the inner surfaces of the side walls of the door. One flange 122 of each of the top and bottom louvers 120 of the series engages with a stop strip 128—129 on the top and bottom walls of the door, when the louvers are in the closed position as shown in Fig. 15.

One end of each rockshaft 121 has connected thereto an arm 130 and all of said arms are connected to a common actuator bar 131 disposed in a vertical position spaced inwardly from the louvers 120. When the bar 131 is moved downwardly from the position shown in Fig. 16 to the position shown in Fig. 17, the louvers are swung into the open horizontal position for the passage of air therethrough into the body 104 of the container 103. The bar 131 has an arm 132 fixed thereto near the top end and the top end of a piston rod 133 is operatively connected thereto. The bottom end of said rod carries a piston 134 that works in a hydraulic cylinder 135 which is pivoted at its bottom end as at 136 to the bottom wall of the door. The rod 133 has a turnbuckle 137 therein whereby the effective length of this rod may be obtained. An expansion spring 138 surrounds that part of the rod between the top end of the cylinder and the turnbuckle and the normal tendency of this spring is to push the rod 133 and bar 131 upwardly so as to keep the louvers in the closed position. Hydraulic fluid under pressure is admitted to the upper end of the cylinder by means of a flexible conduit 139, to force the piston 134 downwardly and through the rod 133, arm 132, bar 131 and arms 130 to move said louvers into the open position shown in Fig. 17.

The conduit 139 opens at one end through the side of the box where it is provided with a nipple 140 in which is a valve 141, the nipple also carrying one part 142 of a union coupling for connection with and disconnection from a companion part 143 of the coupling on a high pressure hydraulic fluid line 144 which is controlled from the cabin 54 as will soon appear. The structure just mentioned best appears in Fig. 20. The conduit 139 is connected with a similar conduit for the louver operating mechanism of the door at the other end of the container so that one control will suffice for both doors of the container.

The doors may be locked closed in any suitable fashion as by the catches 145 shown in Fig. 14. When said doors are in the open position shown in dotted lines at the left hand end of Fig. 14, they may be held in this position by the folding brace arms 146.

It is to be borne in mind that the container 103 is not retained permanently in the cargo carrying section but is removed therefrom at the end of one refrigerating operation and then has another one substituted therefor. Therefore, means is provided whereby said container may not be only inserted into the container carrying section but may be easily withdrawn therefrom, and which means securely holds the container against vertical and lateral movement when said container is in said cargo carrying section.

In the cargo carrying section I provide top and bottom sets of longitudinally spaced, transversely extending, tubular supporting rollers 150 and 151 respectively, each journalled on a transverse tubular shaft 152. All of said shafts are fixed at their ends to the framing of the cargo carrying section. Each roller is provided at its ends with radial flanges 153—153, the rollers being held against endwise shifting by pins 154 that pass through the shaft 152 as best appears in Fig. 10. The rollers 150 and 151 are so spaced apart vertically as to be engaged by the top and bottom surfaces of the container 103 and the length of each roller between the flanges 153 is made to correspond to the width of said container. Thus, when the container is disposed in the cargo carrying section, it is supported against movement vertically or horizontally. In this respect it is pointed out that the angle bars 114 along the corners of the container and its end doors take the wear off the wood structure, of which the container is composed.

In the rear end of the cargo carrying section, I provide a stop structure 155 (see Fig. 4) against which the inner end door of the container is adapted to engage. Thus, when the container as a whole is in the cargo carrying section and the nose is in its closed position, the rear door 105 of the container is engaged against said top structure and the frame 81 on the velocity reducing plate engages the front door of the container so that the container is securely held against endwise movement or shifting.

*Product supporting racks*

The container 103 is adapted to receive and hold a plurality of laterally spaced product supporting racks 160, one end part of which is best illustrated in Fig. 22. Each rack is of a length approximating the inside length of the container body from one door 105 to the other and each rack is of a width to have its top and bottom portions received in vertically aligned grooves 118—118 in the container body, see Fig. 7.

Each rack is in the form of an open frame that includes top and bottom rails 161 and 162 respectively and end corner posts 163 and intermediate side posts 164 respectively. Said frame further includes vertically spaced, longitudinal stringers 166 which are fastened to said corner and side posts. Preferably the parts of the rack mentioned are made of wood and with the arrangement described, a strong light-weight rack is provided, which is capable of holding or supporting a considerable weight without warping. Along the upper surface of the bottom rail 162 I provide a strip 167, the upper surface of which is transversely curved. Secured to this surface is a plurality of longitudinally spaced, downwardly curved, duplex spring fingers 168. Projecting laterally from opposite sides of the top rail 161 of the rack are pairs of hooks 169, there being a pair of hooks for each duplex spring finger 168.

When the racks mentioned are loaded and are disposed within the body of the container 103, the ends of the racks are about flush with the ends of the body. So that the racks cannot shift longitudinally in their grooves 118, when the doors 105 are in the closed position, I provide on the inner end of each door, cross bars 105a as best appears in Fig. 15. One surface of the bars 105a on each door is disposed in the plane of and is engaged by the associated end surfaces of the racks 160 in the container body and thus said bars hold said racks against end play or movement. The racks above described are adapted to support a plurality of packages of the products in strip form.

*Packages of products*

In Figs. 24 and 25 I have illustrated a strip package structure well adapted for holding products such as certain edible commodities. When the package structure is to be used for edible commodities, an open mesh fabric well serves the purpose. Such a package is made from a strip of fabric folded along its longitudinal median line and then double stitched along each margin as at 170. This produces a fabric tube into which measured amounts of the products are introduced at spaced intervals and between said intervals the folded strip is transversely stitched as at 171. This provides, in the strip, filled pockets 173 separated by double thickness webs 174 disposed one between each two adjoining pockets. To produce individual packages from the strip, the same is cut transversely across each web at a point between the spaced lines of stitches 171—171.

In loading a rack 160, a strip of the packages such as shown in Figs. 24 and 25 is cut through certain spaced webs 174 thereof, as will produce a strip a trifle shorter than the normal distance between the fingers 168 and the hooks 169 of the rack. The topmost web portion of the strip is then engaged upon two adjacent hooks 169 which pierce through the web. The bottommost web portion is then engaged with the ends of a pair of fingers 168 which are sprung upwardly before they are caused to pierce said web portion. As the fingers have been tensed before insertion through the bottommost web portion, said fingers tend to return to normal condition and this makes the strip relatively taut so that it is smooth and straight. In this respect it is intended that the side stitches 170—170 shall serve to support the weight of the loaded strip.

For use in connection with food products which are somewhat moist or which will yield some of their moisture during refrigeration, it is preferred to have the packet strip formed of fabric which will absorb a considerable amount of moisture. Since the loaded strip is hung or suspended in such manner that the load is carried by the stitching lines 170—170, the body of the fabric may be of light material and of open weave or texture. Naturally, if the product to be refrigerated is small, such as fresh green peas, the mesh should be finer than for products which are composed of individually larger pieces.

During the freezing operation, a certain amount of moisture will be absorbed by the fabric of the package strip. When frozen, therefore, the whole strip will become rigidified and when removed from the rack, can be handled conveniently. If desired, the strip, after removal from the racks, may be cut between the lines of stitching 171 and each individual package placed in a moistureproof container to prevent dehydration of the product during storage.

*Tail section*

In the tail section of the body, just to the rear of the container stops 155, the skin of said section is formed to provide a plurality of arcuately spaced, longitudinal openings 175—175, each of which tapers in width rearwardly. Parts of the skin from the length of said openings 175 are disposed upon the ribs 56 so as to provide overhanging margins 176 (see Fig. 11) thereon similar to the margins 59 mentioned previously.

Associated with each opening is an air outlet valve plate 177, one of which best appears in Fig. 12. Said plate has an outline shape to conform to its associated opening and is provided along its side and rear end margins with a dropped flange 178 to receive a sealing strip in the manner described in connection with the air inlet valve plate shown in Figs. 2—5—8 and 9. On the under or inner face of each plate 177 is one or more stiffening ribs 179 and at the rear end of each plate are ears 180 which are pivoted to matching ears on the body as at 181. The front end of each plate is provided with a curved segmental extension 182. See Fig. 4.

To swing the air outlet valve plates from one position to the other I provide the following: 185 indicates a hydraulic cylinder disposed in the longitudinal axis of the body. The closed rear end of said cylinder is supported by a spider-like thrust plate 186 (see Fig. 4) suitably connected to the structural members of the body. Disposed in the cylinder is a piston 187 attached to the rear end of a forwardly extending piston rod 188, the front end of which has a head plate 189 fixed thereto. The piston rod slides through the closed front end of the cylinder and within said cylinder between the piston and the closed rear end of the cylinder is a helical expansion spring 190. A flexible conduit 191, leading from a source of hydraulic fluid under pressure, opens into the front end of the cylinder. When fluid is admitted to this end of the cylinder, the piston is forced rearwardly and compresses the spring 190. When said fluid is cut off from said cylinder, the spring 190 moves the piston and piston rod forwardly.

The plate 189 is provided with pairs of ears similar to those on the plate 72 and to each pair of ears there is connected as at 192, one end of a rod 193, the other end of which is pivoted at 194 to the rib on the underside of the associated valve plate. In the rod 193 is a turnbuckle 193a whereby the effective length of the rod 193 may be regulated.

When the valve plates 177 are in their closed position as shown in full lines in Fig. 4, the plate 189 is in its foremost position and the transverse plane of the pivotal connections 192 is disposed forwardly of the transverse plane of the pivotal connections 194, thus providing an overcenter lock for said plates when in the closed position. When the valve plates are in this closed position, the extensions 182 thereof are disposed in the space just to the rear of the stops 155.

When hydraulic fluid is admitted to the front end of the cylinder 185 and the piston 187 is moved rearwardly, this will retract a considerable portion of the rod 188 into the cylinder and the plate 189 will move toward said cylinder. In this movement of the plate, it will operate through the rods 193 to swing the plates 177 inwardly at their front ends until the edges of all of the extensions 182 engage to produce a hemispherical deflector formation 195 shown in dotted lines in Fig. 4. When the air stream enters the tail section after leaving the container, said draft will be deflected upwardly and rearwardly by said portion 195 to pass out through the openings 175.

When the plates 177 are in the open position, as said plates are each wider at the front end than at the hinged rear end, a space 196 (see Fig. 11) is formed between each two adjacent plates. However, this space is in no way detrimental to the operation of the valve plates.

By reference particularly to Fig. 4, it will be observed that when the valve plates 177 are in their open position the air which has passed through the refrigerating chamber or compartment will be discharged outwardly in a generally rearward direction along the skin of the fuselage. This air stream serves somewhat as a lubricant to prevent the extremely high speed atmospheric external air from directly contacting the fuselage skin. Hence the skin friction is somewhat reduced. In other words, energy in the air, which is discharged after it has performed its refrigerating function is utilized to increase the aerodynamical efficiency of the external aft section of the aircraft.

*Cabin and controls*

The cabin 54, which is made pressure-tight, is provided with the usual windows 200 for visibility and has an entrance door 201, best appearing in Fig. 1. In the rear portion of the cabin is a gas engine driven electric generator unit 202 not only for furnishing light and heat and other requirements, but also for driving an automatically controlled air blower capable of maintaining any desired air pressure condition in the cabin.

In the fore part of the cabin is the operator's seat 203 and just forward thereof is an instrument board 204. 206 indicates a manually operable hydraulic pump, the operating handle 207 of which extends into a position along one side of the seat where it is convenient for the operator to reach the same when occupying the seat 203. On the instrument board are located certain instruments for the operator of the plane and also disposed conveniently thereon is a number of four-way valves 208—209 and 210 respectively, best shown in Fig. 21.

Suitable conduits 211 and 212 are provided between the pump 206 and said valves 208—209 and 210 and these have connected to them the conduits leading to the cylinders 135, 65 and 185 respectively.

It is apparent that by manipulation of the pump 206 and the valves mentioned, the inlet valve plates 60, the louvers 120 and the outlet valve plates 177 may be opened or closed by the operator. When open, and the airplane is in flight, air is free to pass through the air inlets 58, the openings 82 in the velocity reducer plate, through the cargo container 103 and out through the air outlets 175.

*Practice of the method and operation of the apparatus*

The product to be refrigerated will be placed in the pockets of the multiple package strips, when said strips will then be secured to the product supporting racks. This work can be advantageously done in buildings located adjacent the product supply. Thus, if it is a farm product the filling may be done in a farm community.

The loaded racks may then be placed in the cargo carrying or refrigerator box or container 103 through the open end. As soon as the box 103 is fully loaded the doors 105 may be moved from the open dotted position to the closed full line position, (see Fig. 14) and locked in closed position by the latches 145. Then box 103 is transported to the airport, if the airport be not immediately adjacent the packing plant. The loaded cargo carrying box is then placed in the fuselage of the specially designed aircraft through the front end, the nose being open at the time.

When the box 103 is in position in the fuselage the necessary connections are made to the hydraulic fluid conduits which lead to the control valves whereby the louvers or shutters 120 are controlled.

After the cargo containing box is loaded, the nose section is closed and it cannot again be opened until the aircraft has landed. The airplane then is ready for flight.

It will be understood that when such flight begins the aircraft at this time is at a relatively low altitude where desired refrigerating conditions do not obtain. The temperature is relatively high, the pressure is relatively high, and there is usually a condition of relatively high humidity, all generally undesirable for refrigeration purposes. Again the atmosphere is frequently one in which there is considerable dirt, bacteria and other foreign matters, detrimental to products to be refrigerated, particularly if they be food or edible products or the like.

For one or more of the foregoing reasons, I prefer that all valves controlling admission of air into the refrigeration chamber be closed after the aircraft apparatus is loaded and while it is traveling through the low, dirt and bacteria-laden atmosphere. After the aircraft has reached an altitude where the air is relatively free from dirt and bacteria and the air is somewhat cooler, then it may be advisable with certain products to permit some air to enter the box 103. When this condition is reached, the pilot sets the control valves in the cabin 54 in the proper position and creates the necessary hydraulic pressure in the fluid lines by operating the hand lever 207 of the pump 206. By pumping a little, the valves may be partly opened.

Conditions of temperature and pressure within the box 103 will be some indication to the operator when air should first be admitted to the box. This will depend somewhat on the particular product being refrigerated, the temperature at which it was placed in the box 103, its degree of ripeness, if it be berries, fruit or the like, etc.

In order that the operator may observe the temperature and the pressure conditions obtaining in the front or inlet end and the rear or outlet end of the box 103, gauges 104a and 104b respectively, that include mechanisms for indicating both temperature and pressure, are arranged on the instrument board 204 in the cabin 54. Each gauge has cables 104c and 104d respectively, which may be plugged into sockets 104e and 104f respectively on one side of the box 103. Each socket is wired to an associated set of suitable pressure and temperature responsive means 104g and 104h respectively, located within and at opposite ends of the box 103, as best indicated in Fig. 3. The means just mentioned may be of the electrical type and the connections are made at the sockets 104e and 104f respectively when the box 103 is moved into position in the fuselage.

When the temperature responsive means 104g at both ends of the box show substantially the same temperature reading, this may be considered as indicating that refrigeration of the product has been substantially completed.

The operator causes the aircraft to attain a high altitude where very low temperature, pressure, and humidity conditions prevail. The exact altitude to which the apparatus should go is not critical and will depend upon a number of factors, such as the product to be refrigerated, the maximum length of time in which the product should be refrigerated, i. e., if it is to be "quick frozen" or not, the distance between point of take-off and the destination, the latitude, the time of year, etc.

Assuming, however, it is desired to "quick freeze" the product, then the aircraft will, under ordinary conditions of relatively high ground temperature, climb until a very high altitude is reached, wherein very low temperatures prevail, say of the order of ten degrees below zero F. or lower. As before stated, some air may have been permitted to pass through the refrigerating chamber which box 103 provides, before the apparatus reaches a high altitude so that some preliminary cooling may have already occurred. However, the principal refrigerating action preferably does not take place until the apparatus reaches a high altitude. Such being the case, the air inlet valves in the nose section and the air outlet valves in the aft section may be closed so that the apparatus en route to the high altitude functions efficiently from an aerodynamical viewpoint.

On reaching the desired high altitude, the pilot through the control valves in the cabin 54 may open the air inlet valve members in the nose section, and outlet valve members in the aft section, as well as the louvers in the front and rear doors of the box 103, which constitutes the refrigerating chamber proper. Large volumes of low temperature air may thus pass through the refrigerating chamber. Because the product is contained in relatively small masses, which present large superficial areas, refrigeration of the product can be quickly accomplished. Since there is available an unlimited amount of the refrigerating medium, and since it is not necessary to use energy to reduce the temperature of the refrigerating medium, it need not be recirculated, but can be used once and then discharged to atmosphere.

Since it is likely that practical operation of the refrigerating apparatus will generally require the delivery of the refrigerated product at a point remote from the place where the unrefrigerated product is loaded, it may be necessary to operate the aircraft at fairly high speeds, not as respect aircraft but compared with land transportation vehicles. Thus, the aircraft may operate at say 150 miles per hour. It is believed that air of such high velocity should not be permitted to enter the refrigerating chamber of box 103. For this reason the velocity reducer 80 is employed to reduce the velocity of air that passes through the refrigerating chamber to some safe velocity. It is thought that velocities of the order of 5000 ft. per minute will not be objectionable and at the same time will permit of the passage of a sufficient volume of air per unit of time to effect the desired refrigeration of the product within the time available.

After the product has been properly refrigerated, the air inlet and outlet valves in the nose and aft sections respectively, as well as the louvers in the front and rear ends of the box 103 are all closed. Because of the heat insulated construction of the box 103, it serves to maintain low temperatures within the box while the craft returns to low altitude, and during removal from airplane and to ultimate storage when container is emptied at the point of destination.

Because the valves in the nose and aft sections are closed during descent, the aircraft functions efficiently from the aerodynamical viewpoint. This is important because it will be appreciated that in my method of refrigeration energy is used to raise the product to a refrigerating atmosphere as distinguished from the heretofore commercial practice of using energy at low altitude to produce the low temperature in the refrigerating medium.

Since it requires work to raise the refrigerating apparatus and its contained cargo load to high altitude, I aim to recover as much as possible of the energy necessarily utilized in this operation. In other words, in raising the refrigerating apparatus and its contained load to high altitude, a store of potential energy is created, which stored energy is converted into kinetic energy in returning or assisting in returning the product to the desired low altitude point of destination. Since generally the product to be refrigerated is loaded at one point for delivery at a remote point, it is feasible to refrigerate the product while in transit by intermediately raising the apparatus to the necessary high altitude, maintaining it at such high altitude, while proceeding in the general direction of destination, for such time as is necessary to effect desired refrigeration and then gliding toward the point of destination, thereby utilizing the stored potential energy resulting from the necessary operation of attaining a high altitude for proper refrigeration.

It is clear from the foregoing that much time can be saved in effecting refrigeration and delivery of the product over the common practice of effecting refrigeration in a ground plant and thereafter loading the refrigerated product on the transportation vehicle. There are, however, other valuable features to which attention should be called. For purposes of illustration let us consider the "quick freezing" of food products for which use the present invention is particularly appropriate. Plants for this purpose operate at low altitudes where the atmosphere is high in humidity. Thus, between the humidity of the atmosphere and such moisture as is given off by the product during refrigeration, a great amount of frost collects on the coils in which the refrigerant circulates. It is, therefore, necessary frequently to discontinue operations in order to defrost the coils. Naturally, there is during operation, also a gradual decrease in efficiency as the frost collects on the coils. Thus valuable time is lost and cost of operation increased.

With the apparatus and method of the present invention, no such moisture difficulty is encountered because the refrigerant is low temperature air of low moisture content. Furthermore, in the preferred form of the invention illustrated, there are no cold coils on which moisture can collect, because the refrigerating medium is cold air having a low moisture content which cold air passes through the refrigerating chamber but once and then is discharged to and dissipated in the surrounding atmosphere.

Another difficulty encountered in the heretofore commercial quick freezing operations relates to the maintenance of frost-free conditions in that part of the apparatus directly in contact with the product. In order to permit the continued operation of such apparatus, it is sometimes necessary to supply gas of the order of carbon dioxide in order to prevent the excessive deposit of moisture on the refrigerated walls of the apparatus. This, of course, is another item of expense and is not necessary in connection with the apparatus and method of the present invention.

When operating commercial plants in the usual manner, it is necessary to provide means for removing dirt from the air if the most sanitary product is desired. Since the present method and apparatus are designed to function at high altitude where the atmosphere is substantially free from dirt, it is unnecessary to provide means for dirt removal.

Again, by refrigerating at high altitude in the manner indicated, adverse action due to bacteria is eliminated because the atmosphere at high elevations has a very low bacterial content.

From the foregoing illustrations, it is obvious that with the apparatus and method of the invention, great practical advantages are attainable and improved products provided. Because of the extreme mobility of the refrigerating apparatus, it is possible to provide quick freezing equipment at any of a large number of points. Berries and fruits may be collected at one point, transported to another section of the country, refrigerating the product en route. Products of an entirely different kind may then be taken aboard and transported on the return trip or taken to some other destination where such products are in greatest demand.

*Description of certain modified constructions*

In accordance with the constructions previously described, the product to be refrigerated is placed in the box 103, which is shown as a single structure occupying substantially all of the cargo carrying portion of the apparatus. There are some advantages in such a construction as the number of parts to be handled is somewhat reduced and it may be possible to insulate the refrigerated product and hold it for a longer period of time in one large well-insulated box. However, if the craft be of considerable size, it may be somewhat difficult to handle one large box, which will fill the cargo space thereof, without special equipment. Again, it may be desired to refrigerate a number of different products which might advantageously require different freezing times and other treatment in order to secure best results. Referring to Fig. 26, this may be accomplished by providing two boxes 103a and 103b arranged in side-by-side relation.

If a still greater number of boxes be desirable, the arrangement illustrated in Fig. 27 may be used, in which four boxes 103c, 103d, 103e and 103f may be employed.

The product holding boxes previously described may be of a length equal to the length of the cargo carrying section of the apparatus, as described in connection with Figs. 1 to 25 inclusive, or they may be arranged as shown in Fig. 28 in which a plurality of boxes 103g and 103h are arranged in an end-to-end alignment.

The cargo receiving box structure 103 illustrated in Fig. 14 and those illustrated in Figs. 26, 27 and 28 serve a number of useful functions. They facilitate the loading of the aircraft, permit the product after refrigeration to be held in refrigerated condition without the need of a refrigerated vehicle during short periods of transfer to storage warehouses, and serve to protect the product against dirt, etc. However, the practice of the invention is not dependent upon the use of such boxes. In Fig. 29 there is shown an arrangement in which the product carrying racks 160 are placed directly in grooves formed in gusset plates 160P carried by the framing of the aircraft structure. Side gusset plates 160S serve with the plates 160P to define a substantially rectangular area which permits of the proper flow of air about the product and yet prevents large volumes of air flowing about the segmental portions where the gusset plates are located. In the structure just described, the aircraft fuselage structure itself forms the refrigerating chamber or compartment in which the product is placed for refrigeration.

In the structures previously described, the air is permitted to come into direct contact with the product to be refrigerated or in contact with the packages in which the product is contained. It may be that for certain products the refrigerating medium should not directly contact the product. In such instances the product may be placed within plates which are good heat conductors and the cold refrigerating medium caused to flow over the plates.

While I have illustrated and described in detail an example of the preferred apparatus and manner of practicing the methods, I do not desire to be limited to specific details of apparatus or method, but intend to cover all methods and apparatus which fall within the scope of my invention, as defined in the following claims.

I claim as my invention:

1. The method of producing refrigeration of products by means of a system of which a powered aircraft is a part, said method comprising operating said aircraft to move the product to be refrigerated through atmospheric air of freezing temperature and causing said atmospheric air of freezing temperature, through which the aircraft passes in flight, to act as the refrigerant and to effect freezing of the product.

2. The method of producing refrigeration of products by means of a system of which a powered aircraft is a part, said method comprising operating said aircraft to move the product to be refrigerated from the earth's surface through atmospheric air of such altitude as to have a freezing temperature and causing said atmospheric air of freezing temperature, through which the aircraft passes in flight, to act as the refrigerant and to effect freezing of the product, and in returning the product to the earth's surface in frozen condition.

3. The method of producing refrigeration of products by means of a system of which an aircraft is a part, said method comprising providing within the airfoil of the aircraft a removable refrigerating chamber with the product to be refrigerated therein, operating said aircraft to move the chamber and its contained product to be refrigerated through atmospheric air of freezing temperature and causing said atmospheric air of freezing temperature, through which the aircraft passes in flight, to act as the refrigerant and to effect freezing of the product in said chamber, and in removing the refrigerating chamber with its frozen product from the aircraft.

4. The method of producing refrigeration of products by means of a system of which a powered aircraft is a part, said method comprising operating said aircraft to move the product to be refrigerated from one altitude having atmospheric air above freezing temperature to a relatively higher altitude having atmospheric air of freezing temperature and causing said atmospheric air of freezing temperature, through which the aircraft passes in flight, to act as the refrigerant and to effect freezing of the product.

5. The method of freezing products by means of a system of which a powered aircraft is a part, said method comprising operating said aircraft to move the product to be frozen through atmospheric air having a temperature not higher than zero F., and in causing said atmospheric air, through which the aircraft passes in flight, to act as the refrigerant to effect freezing of the product.

6. The method of freezing products by means of a system, of which a powered aircraft is a part, said method comprising operating said aircraft to move the product to be frozen through atmospheric air having a temperature not higher than zero F., in causing said atmospheric air, through which the aircraft passes in flight, to act as the refrigerant to effect freezing of the product, and in so protecting the product from atmospheric air having a temperature above the freezing point while the product is being moved by the aircraft, after the product has been frozen, as to maintain the product in frozen condition.

7. The method of quick freezing products by means of a system, of which a powered aircraft is a part, said method comprising operating said aircraft to move the product to be frozen through atmospheric air having a temperature not higher than 10 degrees below zero F., in causing said atmospheric air, through which the aircraft passes in flight, to act as the refrigerant to effect quick freezing of the product, and in so protecting the frozen product from atmospheric air having a temperature above zero F., as to maintain the product in frozen condition while being moved by the aircraft.

8. The method of quick freezing products by means of a system, of which a powered aircraft is a part, said method comprising operating said aircraft to move the product to be frozen through atmospheric air having a temperature not higher than 10 degrees below zero F., and in causing said atmospheric air, through which the aircraft passes in flight, to act as the refrigerant to effect quick freezing of the product.

9. The method of refrigeration which consists in providing an aircraft having a chamber within the skin covering of the aircraft, placing the product to be refrigerated in said chamber while the aircraft is at an altitude having an air temperature above freezing, operating the aircraft to move it to a higher altitude where freezing temperature obtains, causing freezing temperature higher altitude air to pass into the chamber and relative to the product therein to cause freezing of the product and in returning the aircraft to lower altitude with the product in frozen condition.

10. In the operation of a refrigerating apparatus having a refrigerating chamber and including an aircraft, the method of refrigerating products in said chamber, which consists in placing the product to be refrigerated in said chamber, by means of an aircraft, raising the chamber to such high altitude as to encounter air of freezing temperature, and maintaining a freezing temperature in said chamber while at said high altitude by causing relative movement between the freezing temperature air and the product in said chamber, thereby freezing the product and in thereafter returning the frozen product in frozen condition to lower altitude having a higher temperature.

11. The method of refrigeration which consists in providing aircraft means placing the product therein and in moving the product to be refrigerated thereby to a higher altitude where freezing temperature obtains, freezing the product at such higher altitude by means of the freezing temperature higher altitude atmosphere, returning the frozen product to lower altitude in frozen condition, and in removing the frozen product from the aircraft means.

12. The method of refrigerating products during transportation, which consists in providing an aircraft, loading on the aircraft the product to be refrigerated, operating the aircraft with its product load from the loading point to the point of destination and intermediate said points ascending to such a high altitude as to encounter an atmosphere of freezing temperature and while at said high altitude utilizing the freezing temperature atmosphere to freeze said product.

13. The method of refrigerating products during transportation, which consists in providing an aircraft, loading on the aircraft the product to be refrigerated, operating the aircraft with its product load from the loading point to the point of destination and intermediate said points ascending to such a high altitude as to encounter an atmosphere of freezing temperature, establishing such circulation between said atmosphere and the product as to cause freezing thereof, and subsequently reducing circulation during at least part of the time the aircraft is moving to its point of destination.

14. The method of transport-refrigeration of food products which comprises conveying the food products in a traveling carrier at high atmospheric altitudes from a starting point to a predetermined destination distant therefrom, admitting the atmospheric air at said high altitudes in at least one stream into said carrier, controlling the volume of atmospheric air so admitted and thereby controlling the temperature of the interior of the carrier, directing said atmospheric air into contact with said food products interiorly of said carrier during transit to refrigerate the same, and dissipating said atmospheric air subsequently to contact with said food products.

15. The method of transport-refrigeration of food products which comprises conveying the food products in a traveling carrier at high altitudes, admitting air at said high altitudes into said carrier, controlling the volume of air so admitted and thereby controlling the temperature of the interior of the carrier, directing said admitted air into heat exchange relationship with said food products interiorly of said carrier during transit to refrigerate the same, and dissipating said air subsequent to heat exchange from said food products.

16. In the art of conveying food products by aircraft from a loading point to a predetermined destination distant therefrom at relatively high atmospheric altitudes, that method which comprises admitting the atmospheric air at said high altitudes into said aircraft in a plurality of streams from different directions in heat exchange relation with said food products interiorly of said aircraft during transit to refrigerate the same, controlling the volume of atmospheric air so admitted and thereby controlling the temperature of the interior of the aircraft, and expelling said atmospheric air from said aircraft after refrigerating said food products.

17. In the art of conveying food products by aircraft from a loading point to a predetermined destination distant therefrom at relatively high atmospheric altitudes, that method which comprises admitting the atmospheric air at said high altitudes into said aircraft in a plurality of streams from different directions in heat exchange relation with said food products interiorly of said aircraft during transit to refrigerate the same, controlling the volume of air so admitted and thereby controlling the temperature of the interior of the aircraft, and directing said atmospheric air from said aircraft in a plurality of streams after refrigerating said food products.

18. In a refrigerating apparatus, an aircraft, an elongated product holding chamber carried by the aircraft, an end portion of the aircraft being swingable between open and closed positions, atmospheric air inlet valve means in said swingable end portion, and means for actuating said valve means to control passage of atmospheric air to said product carrying chamber.

19. In a refrigerating apparatus, an aircraft, an elongated product holding chamber carried by the aircraft, the aircraft having one end portion swingable between open and closed positions, valve means in the swingable end portion, valve means in the opposite end portion, said valve means cooperating to pass atmospheric air through said chamber, and means for actuating the valve means.

20. In a refrigerating apparatus, an aircraft, an elongated product holding chamber carried by the aircraft, atmospheric air inlet valve means in the forward end portion of the aircraft, means for actuating said inlet valve means, a plurality of air outlet valve plates pivotally mounted in the aircraft body to swing to open and closed positions, said plates having air guide portions mutually engageable when the plates are fully opened to provide an air discharge deflector, said inlet valve means and the outlet valve plates cooperating to pass atmospheric air through said chamber, and means for actuating said plates.

HARRY W. PROTZELLER.

REFERENCES CITED

The following references are of record in the file of this patent:

UNITED STATES PATENTS

| Number | Name | Date |
|---|---|---|
| 41,053 | Blinval | Jan. 5, 1864 |
| 306,080 | Jennings | Oct. 7, 1884 |
| 1,141,274 | Skall | June 1, 1915 |
| 1,276,500 | Martini | Aug. 20, 1918 |
| 1,308,406 | Mott | June 7, 1921 |
| 1,409,877 | McNeil | Mar. 14, 1922 |
| 1,427,872 | Verville | Sept. 5, 1922 |
| 1,948,790 | Grayson | Feb. 27, 1934 |
| 2,058,659 | Bellanca | Oct. 27, 1936 |
| 2,092,655 | Page | Sept. 7, 1937 |
| 2,142,505 | Gammeter | Jan. 3, 1939 |
| 2,196,080 | Reynoldson | Apr. 2, 1940 |
| 2,201,249 | Tormollan | May 21, 1940 |
| 2,214,722 | Seversky | Sept. 10, 1940 |
| 2,237,257 | Finnegan | Apr. 1, 1941 |
| 2,256,166 | McCarthy | Sept. 16, 1941 |

FOREIGN PATENTS

| Number | Country | Date |
|---|---|---|
| 167,068 | Great Britain | Aug. 4, 1921 |
| 510,539 | France | Sept. 8, 1920 |